United States Patent [19]

Tally

[11] 4,327,775
[45] May 4, 1982

[54] FORMABLE HOSE WITH A REFORMABLE INSERT

[75] Inventor: David N. Tally, Arvada, Colo.

[73] Assignee: The Gates Rubber Company, Denver, Colo.

[21] Appl. No.: 795,343

[22] Filed: May 9, 1977

[51] Int. Cl.³ .................. F16L 55/00; F16L 11/11
[52] U.S. Cl. .................. 138/103; 138/DIG. 8; 138/122
[58] Field of Search .......... 138/DIG. 8, 178, 138, 138/139, 103, 172, 118, 121, 122; 222/527

[56] References Cited

U.S. PATENT DOCUMENTS

| | | | |
|---|---|---|---|
| 314,440 | 3/1885 | Eames | 138/139 X |
| 1,551,893 | 9/1925 | McDonald | 138/139 X |
| 1,593,016 | 7/1926 | Campbell | 138/178 X |
| 1,731,322 | 10/1929 | Riddle | 138/139 X |
| 2,759,765 | 8/1956 | Pawley | 138/DIG. 8 |
| 3,402,741 | 9/1968 | Yurdin | 138/118 |

Primary Examiner—Harry N. Haroian
Attorney, Agent, or Firm—H. W. Oberg, Jr.; C. H. Castleman, Jr.; Raymond Fink

[57] ABSTRACT

A contour formable hose with a reformable insert disposed in the hose duct, the insert with at least two spaced ring means that engage an internal annular portion of the hose interior wall so that a ring means is located near each end portion of the hose. A rod bias means is interpositioned between and attached to the ring means and the rod bias means is capable of being yielded to a new bias shape.

6 Claims, 9 Drawing Figures

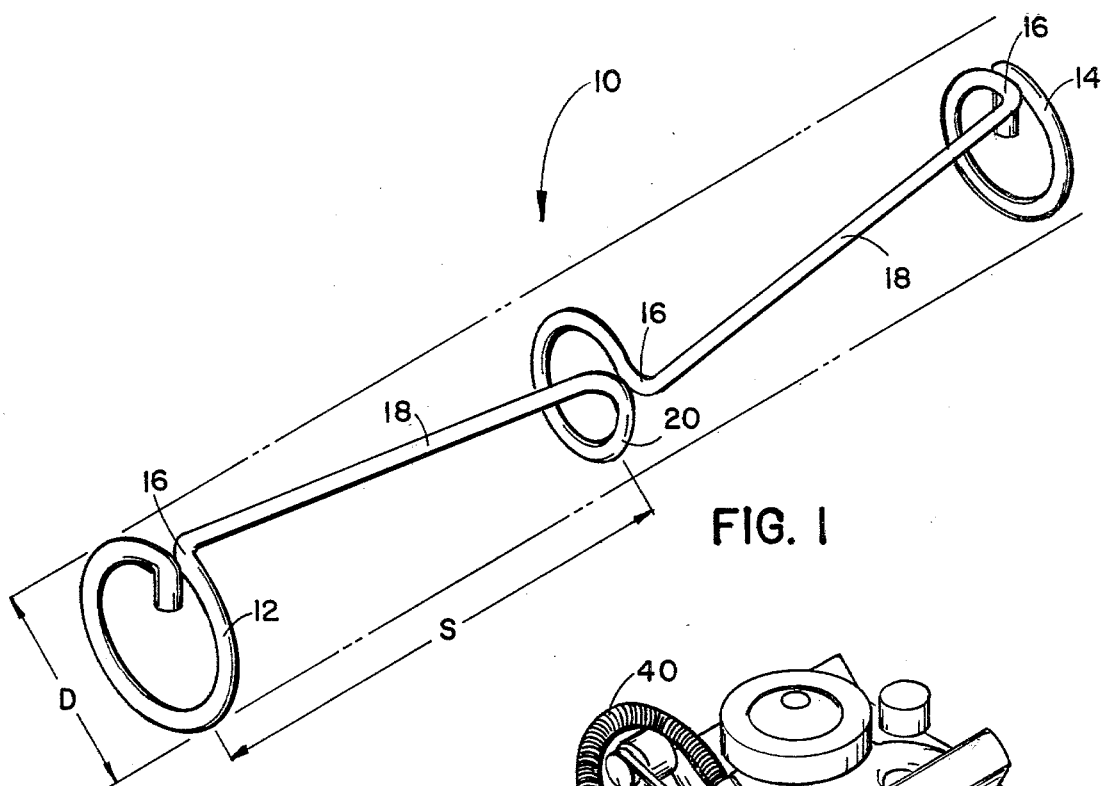
FIG. 1
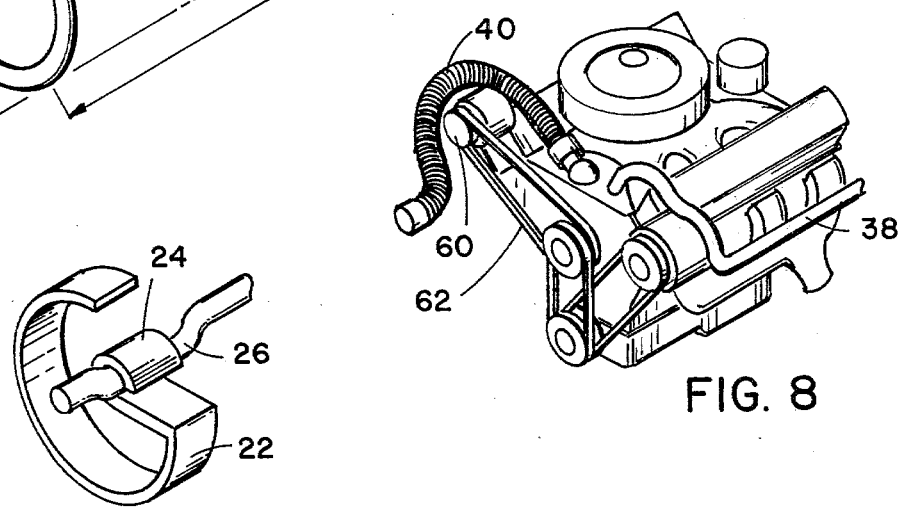
FIG. 8
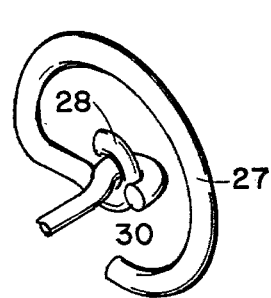
FIG. 2
FIG. 3
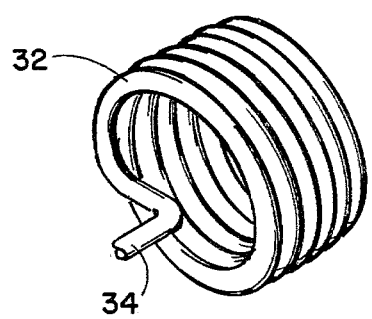
FIG. 4

FORMABLE HOSE WITH A REFORMABLE INSERT

BACKGROUND OF THE INVENTION

The invention relates to pipes and tubular conduits, but more particularly, the invention relates to flexible hose with means disposed in the hose duct that facilitates retaining the hose in a desired curve contour.

Radiator hose and heater hose are used extensively by the automobile industry. Radiator hose is used for ducting a cooling fluid between an engine block and radiator while heater hose is used for ducting warm fluids between an engine block and a passenger compartment heater element. Some radiator and heater hose are molded with compound curves to facilitate fluid ducting requirements dictated by the automobile manufacturers. Oftentimes, such hose (especially radiator hose) must be molded with several compound curves and ends of different diameters. The complex curved shapes are oftentimes required to avoid interference with engine system components such as V-belts, alternators, air conditioning compressors, or power steering pumps. Curved hose is configured by manually placing hose stock material over a curved mandrel and then heat setting the stock material while in the curved shape. Curved hose having a center line length generally beyond 36 inches are typically not produced because of the difficulty of manually placing the hose product on and removing it from a curved mandrel. Of course, the number and degree of compound bends affects the difficulty of placing and removing a hose from a mandrel.

While curved or preformed hose solves routing problems for an original equipment manufacturer, it creates inventory problems for an aftermarket hose distributor. The aftermarket hose distributor (e.g., a filling station) may find it economically unfeasible to attempt to stock curved hose for all applications. Corrugated hose has become a popular replacement for curved hose to the small hose distributor because he can carry only a small corrugated hose inventory that is suitable as a substitute for a plurality of differently configured curved hoses. For example, one length of corrugated hose may be an effective substitute for ten or more curved hose configurations.

Corrugated hose usually has two sleeve ends or "cuffs" which are interconnected by a corrugated hose wall. The corrugation may be in the form of helical convolutions or annular rings. The corrugations permit a folding of the hose wall in a manner which avoids kinking. However, some bent hose configurations require a collapse resistant reinforcement located near the corrugations. For example, such a reinforcement may be in the form of a helical spring disposed at the internal or external diameters of the hose wall, or the spring may be embedded in the corrugation. A hose having annular rings may require wire loops disposed at the internal or external diameters of the convolutions, or be completely embedded within the wall of the hose. Examples of corrugated hose are disclosed in the following U.S. Patents which are hereby incorporated by reference as showing various types of corrugated hose: U.S. Pat. Nos. 2,936,812; 3,050,087; 3,194,705; 3,379,805.

Although corrugated hose is an acceptable substitute for many curved hose applications, it has not been a "cure all" substitute for all curved hose applications. Corrugated hose tends to take a symmetrical curved shape as the ends of the hose are positioned in parallel and/or angular misalignment. For example, a hose may be shaped to an "S" bend but both loops of the "S" tend to have the same bend radius. Many curved hose applications require unsymmetrical shapes to avoid interference with engine components. In such situations, a corrugated type hose may be unsuitable because it cannot readily support itself in compound curves at various bend radii around an obstacle.

Various hose inserts have been developed as hose kink preventers or as hose coiling devices. Examples of such inserts appear in U.S. Pat. Nos. 2,640,502 and 3,610,289. The inserts maintain the hose at a constant bend radius in the case of extensible coiled hose, or prevent a hose from kinking as it is flexed to various bend radii. While hose inserts are known in the art, they are not adapted to maintain a hose in a fixed straight or curved configuration.

SUMMARY OF THE INVENTION

In accordance with the invention, a hose insert and a combination hose with an insert is provided. The hose insert has at least two spaced rings which are interconnected by a reformable rod means. The insert is disposed in the hose duct so that at least two ring means are positioned near and are in contact with internal annular wall portions of the hose. Preferably, a ring means is positioned near each end of a hose. Several ring means may be spaced along and interconnected to the rod means. The intermediate annular ring means may be configured to either press or not press against internal annular wall portions of the hose. The rod means material is chosen so that the rod means may be reformed to a new bias position. The insert may be used with either straight wall or preferably corrugated wall hose. More preferably, the insert is used with corrugated hose which has a collapse resistant spring means positioned therewith. The hose with insert may be bent to various radii to give the hose a permanent curved configuration.

An object of the invention is to provide an insert for a hose which is adapted to retain the hose in a permanently curved configuration as the insert is reformed.

Another object of the invention is to provide a corrugated hose which is a suitable replacement for curved hose.

An advantage of the invention is that a piece of hose may be bent to a desired configuration at various bend radii at various compound curves.

Another advantage of the invention is that the insert facilitates sharp bends in a hose at a plurality of bend radii.

Another advantage of the invention is that a hose distributor may stock only a few pieces of corrugated hose with an insert of the invention instead of several pieces of curved hose with various contours.

These and other objects or advantages of the invention will be more apparent after reviewing the drawings and description thereof wherein:

FIG. 1 is an isometric view showing the reformable hose insert of the invention;

FIG. 2 is an isometric partial view showing an alternate form of the insert of the invention;

FIG. 3 is an isometric partial view showing an alternate form of the insert of the invention;

FIG. 4 is an isometric partial view showing an alternate form of the insert of the invention;

FIG. 8 is a schematical representation showing the hose-insert combination of the invention installed on an automotive engine;

DESCRIPTION OF THE PREFERRED EMBODIMENTS

Figure 5:
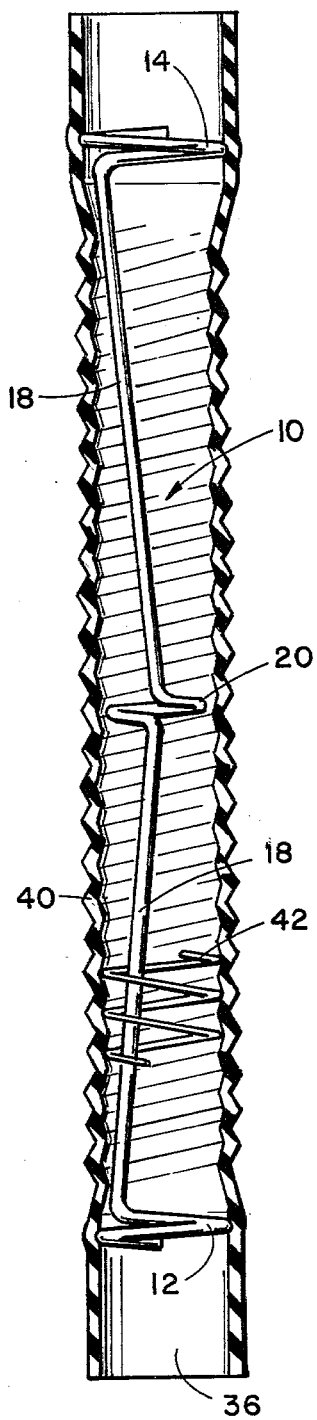
FIG. 5 is an axial cross-sectional view of a helically corrugated type hose with the insert of the invention disposed in the hose duct.

Referring to FIG. 1, a hose insert 10 is provided that has at least two generally coaxially aligned ring means 12, 14, interconnected 16 by an interpositioned rod bias means 18. The ring means may be made of one or more coils of wire. The outside diameter, O.D., of the ring means is chosen to fit within the internal diameter, I.D., of a chosen hose duct. The ring means need not have the same diameter D because as in the case of corrugated hose, one hose "cuff-end" may be larger in diameter than the other "cuff-end." Also, the ring means diameters may be chosen to facilitate easy placement of the insert within a hose duct which will later be explained. The ring means 12, 14 preferably have some type of resiliency so that they may either be sprung to a smaller diameter and inserted within a hose duct, or be capable of exerting some type of resiliency after they have been reformed to a larger diameter after being placed within a hose duct. Other ring means 20 of the same or different diameters, preferably smaller, may be optionally spaced intermediate the two end ring means 12, 14. Of course, each annular ring means may not be a complete coil, however, it is preferred that it forms at least a major portion of a spring coil so that it may properly contact the internal wall of a hose when the insert is used.

As shown in FIGS. 2 and 3, a ring means need not be formed as an integral part of a rod bias means. A separate flat spring-type annular ring means 22 may be used. The flat spring-type ring means 22 may have a loop 24 that attaches to a dog leg 26 formed in the rod bias means. A wire-type ring means 27 may be joined to a rod bias means with interconnecting chain loops 28, 30. FIGS. 2 and 3 are also exemplary of a ring means formed as at least the major portion of a spring coil. FIG. 4 is illustrative of a ring means 32 with several spring-type coils formed of and attached to a rod bias means 34.

The rod bias means is interpositioned between and attached to each ring means. The rod bias means may be an integrally part of an insert (FIGS. 1 and 4) or the rod bias means and ring means may be separately attached components (FIGS. 2 and 3). The rod bias means may interconnect the ring members along any chosen path between spaced ring means. It is unnecessary that the rod bias means be coaxial with or a cylindrical element between the ring. However, the rod bias means is oriented generally in the same direction as the axis of the ring (e.g., within the diameter D).

The rod bias means holds the ring means a desired spacing apart. The rod bias means is of any suitable material such as wire that is adaptable to be reformed past its yield point to a new shape and bias position. Similarly, the ring means is preferably of a material that is reformable past their yield point to a larger annular shape. As an example, a suitable material for a rod bias means interconnected and common to 1.75 inch O.D. ring means is 0.156 inch wire which has a yield point from about 25,000 psi to about 65,000 psi. A low carbon wire like mild steel welding rod has physical characteristics which fall generally within this range.

The insert 10 is placed in the duct of a hose as exemplified in FIGS. 5–9. The insert is easily placed in the duct of a hose when the O.D. of the ring means has a smaller diameter than the I.D. of the hose. An expanding device such as known in the art for expanding a stem of a hose coupling can be used to radially expand the ring means against an internal annular wall portion of the hose near each hose end. Ring means spaced intermediate of the end ring means need not be so expanded. Inversely, the ring means may have a larger initial O.D. than the I.D. of the hose duct. In this case, a funnel-like tool may be used to compress the ring means to a smaller diameter so that it may be easily inserted. When the tool is removed, not shown, the ring means engages an annular wall portion of the hose.

For hose ducts 36 having an internal diameter generally of 1 inch or greater, it is preferred that the spaced intermediate annular ring means 20 be used for best hose contouring results. The desired spacing S for any particular hose can be established by simple experimentation. However, it has been found that a spacing from about 3 to about 10 times the ring means O.D. (e.g., D) is usually satisfactory. However, in some instances it may be desirable to use only two annular ring means as shown inserted in the heater hose 38 of FIG. 7.

Figure 6:
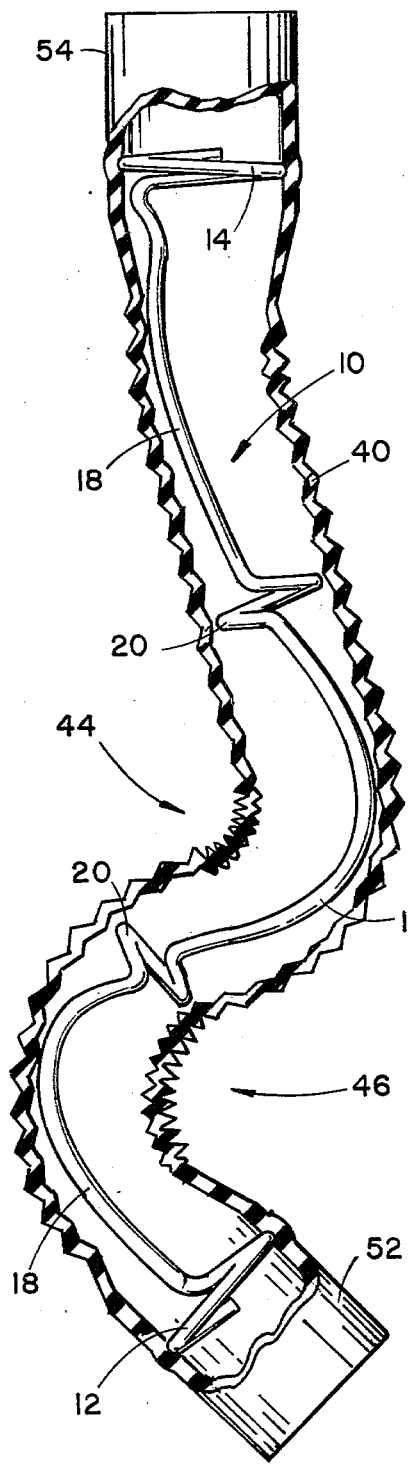
FIG. 6 is a cutaway axial cross-sectional view showing a corrugated hose—insert combination of the invention as reformed from a straight to a curved configuration.

The hose 40 of FIGS. 5 and 6 are of the helically corrugated type so that a helically wound collapse resistant spring 42 may be used (partially shown for clarity). The helical spring 42 substantially inhibits hose kinking when the hose is bent to a desired curve shape.

Figure 7:
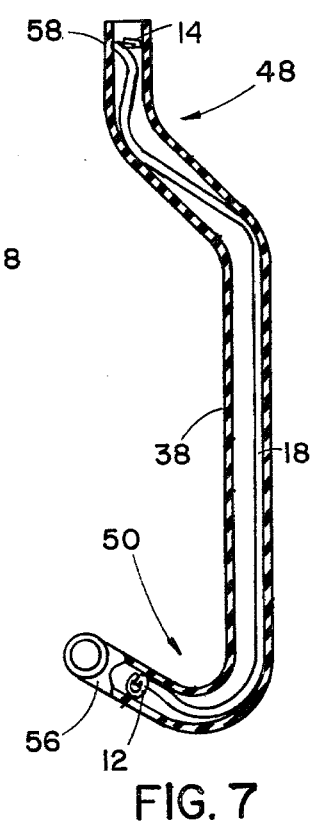
FIG. 7 is a view similar to FIG. 6 showing the insert installed in a heater-type hose.

In use, the O.D. of the hose is grasped and bent to desired radii 44, 46, 48, 50 as shown in FIGS. 6 and 7. As the hose is bent, the rod means 18 is deformed past its yield point to a new shape. The bias of the rod means holds the hose in the desired curve shape. The ring means are engaged against internal annular wall portions of the hose adjacent its cuffs 52, 54 or ends 56, 58 which permits the rod bias means to hold the curve shape by maintaining center line distance of the hose. Desired combinations of straight sections and bends of various radii may be made in the hose. The intermediate ring means 20 helps support horizontally oriented portions of the hose from drooping from gravity effects when the hose is supported at its ends as by two fittings. The so-formed hose may then be installed into service such as in an engine cooling system.

Referring to FIG. 8, the hose 40 is bent into a curved configuration which avoids associated engine components such as sheaves 60 and belts 62 of a front engine belt drive. The insert biases the hose 40 in a curved configuration which maintains the hose a safe clearance from engine components that can inflict damage to the hose.

Similarly, the heater hose 38 is bent into a desired configuration and installed in an engine system. The heater hose is connected at one end to an engine block and then routed around obstructing engine components.

ADDITIONAL SPECIES

Figure 9:
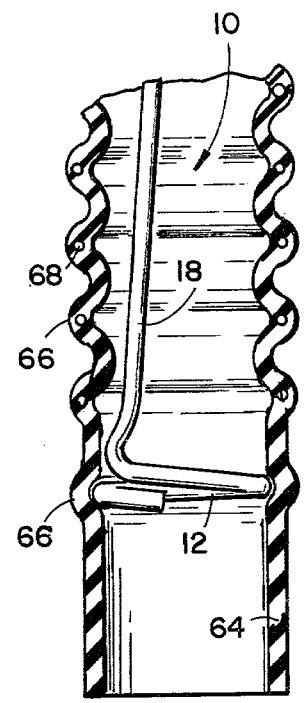
FIG. 9 is a partial axial cutaway view showing the hose insert of the invention installed in a hose having an insert retention means.

A hose 64 may be formed with special means for receiving the insert and maintaining it in a fixed relation to the hose. Referring to FIG. 9, an annular groove 66 is molded along the internal duct of a hose to receive an annular portion of a ring means that has a larger O.D. than the hose I.D. The annular groove maintains a fixed mechanical relationship with the annular ring means. Several annular elements 66 may be optionally used to provide the hose wall corrugations. In this case, separate annular ring means 68 may be desirable to prevent hose kinking in small bend radii of less than about 1 hose diameter.

The foregoing detailed description is made for purpose of illustration only and it is not intended to limit the scope of the invention which is to be determined from the appended claims.

What is claimed is:

1. In a corrugated type hose with cuff ends, a collapse resistant reinforcement, and an internal wall, the improvement comprising:
a reformable insert disposed in the hose and comprising at least two generally coaxial ring means, each having an outside diameter and yield point, the ring means axially spaced in relation to the hose with a ring means engaging and biased against annular portions of the internal wall of the hose at each cuff end; and a flexible and substantially uncoiled rod means having a yield point and oriented generally axially with the hose and attached to the spaced ring means, the rod means capable of and for being deformed past its yield point to a new retentive shape.

2. The hose as claimed in claim 1 wherein ring means spaced intermediate of those ring means at the cuffs are smaller than those ring means spaced intermediate of the cuff ends.

3. The hose as claimed in claim 1 wherein the collapse resistant reinforcement of the hose is a helical wire.

4. The hose as claimed in claim 1 wherein the reformable insert is made of wire.

5. The hose as claimed in claim 1 wherein the wire has a yield strength from about 25,000 psi to about 65,000 psi.

6. The hose as claimed in claim 1 wherein the spacing between ring means is from about 3 to 10 times the outside diameter of the ring means.

* * * * *